United States Patent [19]

Lundeberg

[11] 4,150,250
[45] Apr. 17, 1979

[54] STRAIN RELIEF FITTING

[75] Inventor: Russell E. Lundeberg, West Hartford, Conn.

[73] Assignee: General Signal Corporation, Rochester, N.Y.

[21] Appl. No.: 812,196

[22] Filed: Jul. 1, 1977

[51] Int. Cl.[2] .......................................... H01R 13/58
[52] U.S. Cl. ................. 174/65 SS; 285/158; 285/354; 339/107; 403/195; 403/197
[58] Field of Search ............... 174/65 SS, 65 R; 248/56; 339/107, 103 B, 103 R, 103 C; 403/342, 195, 197, 23.8; 285/114, 115, 116, 354, 340, 322

[56] References Cited

U.S. PATENT DOCUMENTS

| 3,271,053 | 9/1966 | Kurachi | 285/340 X |
| 3,739,076 | 6/1973 | Schwartz | 174/65 SS X |
| 3,744,008 | 7/1973 | Castellani | 248/56 |
| 3,986,737 | 10/1976 | Krusche | 285/354 X |

FOREIGN PATENT DOCUMENTS 430356  6/1935  United Kingdom.

Primary Examiner—Bruce A. Reynolds
Assistant Examiner—D. A. Tone
Attorney, Agent, or Firm—Milton E. Kleinman; George W. Killian

[57] ABSTRACT

In many assemblies it is desirable to provide a strain relief device to grip an electric cord to prevent longitudinal motion of the cord, with respect to the strain relief device. The disclosed strain relief member surrounds the electric cord and is enclosed within a body member which, when assembled, applies longitudinal compressive forces on said strain relief member to cause a central portion thereof to collapse axially inward and grippingly engage the electric cord. The central portion may include serrations for improved restraining of the cord. The strain relief member may be made of plastic or metal and may include central perforations and/or portions of different thicknesses to facilitate and control the collapse. A metallic strain relief member may serve ground metal sheathed cable. A resilient membrane in a plane normal to the longitudinal axis of the cord and the strain relief member may be used between the strain relief member and the body member to provide a liquid tight seal. The collapsing feature of the strain relief member permits a strain relief member of predetermined proportions and characteristics to be used with a wide range of cable sizes.

13 Claims, 4 Drawing Figures

U.S. Patent
Apr. 17, 1979
4,150,250
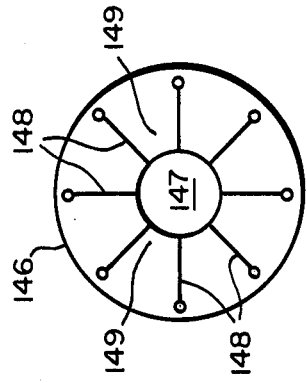
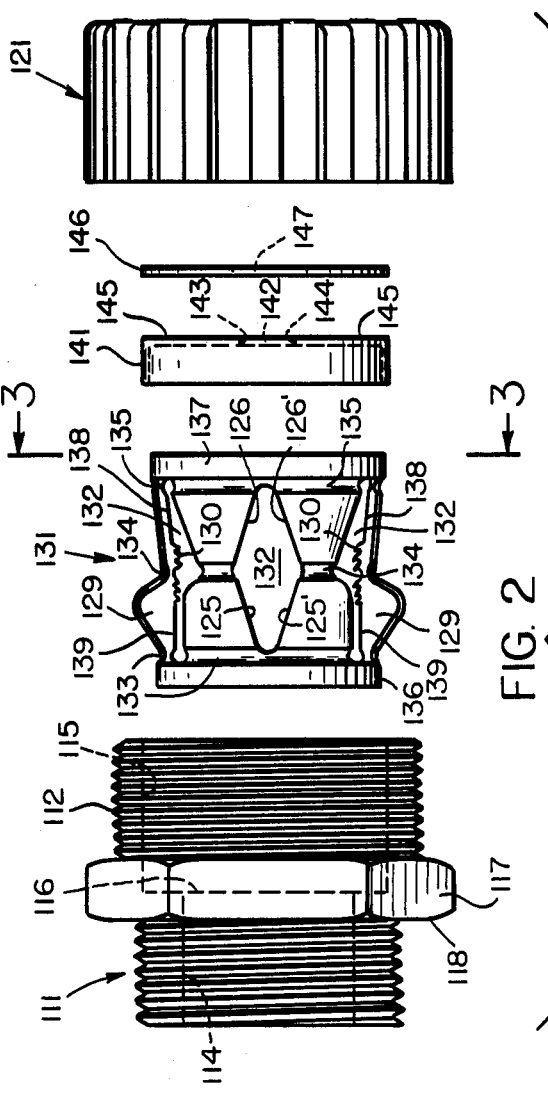
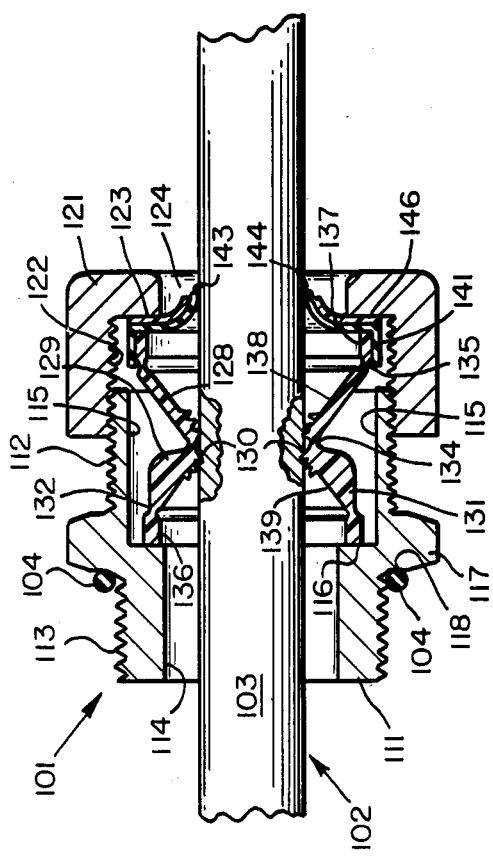

STRAIN RELIEF FITTING

BACKGROUND OF THE INVENTION

Strain relief fittings for electrical cords provide a means for restraining longitudinal motion of the cord, with respect to the strain relief fitting, in response to a longitudinal force on the cord. A usual object is to prevent any strain from being transmitted to the electrical connection. Such devices are widely used on appliances and in other applications wherein an electrical cord passes through a panel or wall. One of the simplest forms of strain relief devices comprises tying a knot in the wire to form an enlarged portion which is too large to pass through a hole in the wall. Other simple forms include a post around which a wire is tied; a girdle compressively encircling the cord and attached by some convenient means to the panel; and a wedging device to preclude longitudinal motion of the electrical cord. Other simple devices have been employed which apply encircling pressure and/or puts one or more sharp bends in the wire to restrain the wire from longitudinal motion. Each of these techniques, and a wide variety of other techniques, have served admirably in particular types of applications. Other varieties of strain relief devices have been developed for specialized applications and/or to accommodate a wide variety of types and sizes of electrical cords. Each type has its advantages and limitations. Some provide inadequate holding force; others pierce or otherwise damage the wire; some fail to provide a liquid tight seal; others are too expensive.

Strain relief devices have been combined with liquid tight techniques for preventing the transmission of moisture from one side of a panel or wall to the other. When liquid tight seals are desired, it has been conventional to provide a rubber or elastomeric sleeve which has a hole therethrough with slightly slanted sides through which the electrical cord is passed. Subsequently, a body member enclosing the sealing sleeve provides a compressive force which causes the sleeve to engage the electrical cord to provide a liquid tight seal. In some prior art structures, a liquid tight seal of the type described is combined with a gripping member which is somewhat analogous to the jaws of a drill chuck in that the gripping member includes a plurality of fingers which are cammed to be deflected angularly inward in response to the assembly of a body around it.

These prior art forms of strain relief devices have a variety of disadvantages. For example, some require an excessive number of parts which may be difficult and/or inconvenient to assemble. In many cases, a given structure works only with a very limited range of cable sizes. Some have a tendency to rupture the cable sheath or inflict other damage on the cable. Some fail to provide sufficient pull out resistance. Some prior art devices tend to lose effectiveness in time and/or when exposed to certain environments such as some chemical atmospheres and/or wide temperature and/or humidity ranges.

SUMMARY OF THE INVENTION

The present invention overcomes many of the difficulties of the prior art structures. The present invention comprises a generally cylindrical sleeve which has longitudinal slots, or slits, which may extend from approximately 60 to 80 or 90 percent of the longitudinal length of the sleeve. The sleeve is normally formed to have a minimum internal and external circumference at a point approximately midway of its longitudinal length. With the sleeve proportioned in this manner, it will respond to longitudinal compressive forces on its ends by collapsing radially inward in the area of the minimum internal and external circumference. The collapsing inward causes the central portion of the sleeve to come in contact with, and grip, the electrical cord encircled by the sleeve. The sleeve member has longitudinal forces applied thereto by enclosing it in a body member comprising first and second members which are threadingly engaged and each of which includes a platform for engaging one end of the sleeve and for applying a longitudinal force on the sleeve in response to increasing the threaded engagement of the body members. The longitudinal slots in the sleeve provide space which allow portions of the sleeve to collapse radially inward without interference.

When a liquid tight seal is desired, a pierced elastic diaphragm member is placed between one end of the sleeve and its cooperating body member portion. The diaphragm member is selected to have appropriate properties of resilience to permit a wide variety of cable sizes to be pushed through the hole without rupturing the diaphragm member. In a typical application, the diaphragm member will expand to accommodate the electric cable and will form a liquid tight contact with the electric cable. The membrane must be made of a suitable elastomeric material to prevent rupture and to form a water tight sealing engagement with the electric cable. Special membrane material may be used to withstand certain chemical atmospheres and/or temperature ranges.

The strain relief cylinder, when made of metal, is normally intended for a single use. That is, when the metallic sleeve collapses radially inward, at approximately the midpoint, to grip and secure the electric cable, the sleeve is permanently deformed and cannot be reused and must be broken or cut off from the electric cable if changes are desired. When the strain relief cylinder is made of plastic, it may not be permanently deformed and adjustments and/or reuse may be made of the sleeve. However, it is not anticipated that it would be necessary, economical or expedient to design the sleeves to accommodate a large number of reuses.

The metallic sleeve 131, when used with metal sheathed cable, may be used as a ground connection to the sheath.

Experience has shown that when a properly designed plastic sleeve is employed, an adequate pull out resistance may be obtained by finger tightening the body member. The metallic sleeve may require tightening with a wrench or other tool.

It is an object of the invention to provide a new and improved strain relief fitting.

It is a more specific object of the invention to provide a strain relief fitting, for an electrical cable, which responds to longitudinal forces.

It is another object of the invention to provide a strain relief fitting which is designed to include a mid-portion which collapses axially inward in response to longitudinal forces applied to the ends of the strain relief member.

It is another object of this invention to provide a new and improved liquid tight seal in a strain relief fitting.

It is another object of this invention to accommodate a maximum number of cable sizes with a minimum number of fittings.

BRIEF DESCRIPTION OF THE DRAWING

The drawing comprises a single sheet having four figures and in which a given element is identified by identical identifying numbers in all views.

FIG. 1 comprises the strain relief fitting of the invention completely assembled and securing the cable. The elements are shown in cross section to facilitate identification thereof and to provide an improved understanding of the function of the various components;

FIG. 2 comprises an exploded view of the elements of FIG. 1 to illustrate more details of each element;

FIG. 3 comprises an end view of an element of FIG. 2 viewed from the line 3—3; and FIG. 4 comprises an end view of another element of FIG. 2.

DESCRIPTION OF THE PREFERRED EMBODIMENT

FIG. 1 discloses the strain relief fitting of the invention in cross section and in operative engagement with an electrical cable for preventing longitudinal motion of the cable with respect to the strain relief fitting. It will be shown hereinbelow that the strain relief fitting will accept a wide range of cable sizes without any change or substitution of parts in the fitting. Therefore, a minimum number of fittings will serve a maximum number of cable sizes. It will also be seen that the fitting provides a gripping action on the cable such that there is a high pull out resistance. An optional member of the fitting provides for a liquid tight seal. When required, the fitting may be made to be heat resistant and/or corrosion resistant.

Considering now more specifically the details of FIG. 1, there will be seen a strain relief fitting indicated generally as 101 which serves to grip an electrical cable indicated generally as 102 and which includes a protective covering 103 of rubber of some other type of plastic or elastomeric material. The covering 103 may also include textile coverings, woven coverings of thread or metal, or soft metallic coverings such as lead or aluminum or any of a wide variety of coverings as customarily used in the trade. The covering 103 may cover one, or a plurality, of individual conductors which may be solid or stranded, all as is typical in the trade.

The strain relief fitting 101 comprises a plurality of elements including a body member 111, a gland nut 121, a strain relief grommet 131, an elastomeric sealing grommet 141, and a washer 146 which may be fabricated of a polymeric material or a fiber material, or be made of a metallic material.

As is readily apparent from an examination of FIG. 1, the body member 111 includes threads 112 which mate with corresponding threads 122 on gland nut 121. The body member 111 also includes threads 113 which provide a means for coupling the strain relief fitting 101 with some other member such as a panel (not shown) in a conventional manner as is well known to those familiar with devices of this class. As may be seen in both FIGS. 1 and 2, the body member 111 has an interior opening longitudinally therethrough which abruptly changes diameter at approximately a midpoint. Wall 114 comprises the inner surface of the lesser diameter longitudinal hole while wall 115 comprises the inner surface of the larger diameter longitudinal hole. The abrupt change from wall 115 to 114 creates a ledge 116 which will serve a function to be described more fully hereinbelow. The body member 111 also includes a flange 117 which may have any convenient exterior shape to facilitate gripping and turning the body member 111. The shape may be square, hexagonal (as illustrated), octagonal or any other shape which may suit the requirements of the particular application. If a liquid tight seal is desired between the body member 111 and the panel, or other member (not shown), to which the body member 111 is coupled, a neoprene ring 104 or other suitable device, may be used and/or the surface 118 of the flange 117 may be modified in any of a variety of conventional manners with which those skilled in the appropriate arts are familiar.

As stated, and as indicated in FIG. 1, the gland nut 121 has threads 122 which engage with the threads 112 of the body member 111. In addition, the gland nut 121 includes a ledge portion 123 which serves a function to be described more fully hereinafter. The gland nut 121 also includes a central opening 124 which is at least of sufficient size to admit freely the passage of the electric cable 102 therethrough. The gland nut 121 may be knurled or otherwise conveniently shaped for gripping thereof and turning with respect to the body member 111.

The body member 111 and the gland nut 121 may be fabricated from any suitable material which is customarily used in the electrical fitting trade. The particular material employed for a particular application may depend upon a wide variety of circumstances including, but not limited to, the humidity and/or chemical content of the surrounding atmosphere, the need for occasional replacement and/or readjustment of the cable 102, the desirability of a particular aesthetic appearance, the desirability of having the member be either conducting or nonconducting, and the type of tool which may be used for effecting a secure assembly.

Considering now more specifically the strain relief grommet 131, this will be seen to be a member which has a generally cylindrical shape, but of an irregular cross section. As may best be seen in FIG. 2, the strain relief grommet 131 will include a plurality of holes 132 which are generally spaced at regular intervals. It will also be seen that the strain relief grommet 131 includes portions 133, 134, and 135 which are thinner than any of the other portions thereof. At the left and right ends of the strain relief grommet 131, there are rings 136 and 137, respectively, as may be seen in FIGS. 1 and 2. As may be seen in FIG. 1, when the strain relief grommet 131 is assembled within the interior of the strain relief fitting 101, the ring 136 includes a surface which bears on the ledge 116, and the ring 137 includes a surface which would bear on the ledge 123 if the grommet 141 and washer 146 were not in position. As may best be seen in FIG. 2, the strain relief grommet 131 includes interior walls 138 and 139 which, when the strain relief grommet 131 is in its original condition, are preformed to be at a slight angle such that the thin portion 134 is slightly closer to the longitudinal axis of the strain relief grommet 131 than the thin portions 133 and 135. Because of these initial conditions and the positioning of the thin portions 133, 134, and 135, it will be evident that when the strain relief grommet 131 is assembled between the body member 111 and the gland nut 121 and the gland nut is turned with respect to the body member 111 to cause a longitudinal compressive force on the rings 136 and 137 of the strain relief grommet 131, the thin portions 133, 134, and 135 will function somewhat as a hinge causing flexure of the strain relief grommet 131 and the thin portions 133, 134, and 135 such that the portion of the strain relief grommet in the vicinity of the thin portion 134 will collapse radially inward to cause the gripping area 130 to come in contact with the covering 103 of the electric cable 102. The gripping area 130 may include teeth or serrations to permit improved engagement with the covering 103 for further inhibiting longitudinal movement of the electric cable 102 with respect to the strain relief fitting 101. The increased web thickness of the strain relief grommet 131 at areas 128 and 129 provides strength and rigidity for preventing flexure of the strain relief grommet 131 at undesired locations and for resisting longitudinal motion of the electric cable 102 with respect to the strain relief fitting 101 in response to a longitudinal force on the cable 102.

It will be appreciated that the strain relief grommet 131 provides the gripping action only and plays no significant part in an assembly which is designed to be liquid tight. As described and illustrated, the strain relief grommet 131 is comprised of a hollow cylinder with evenly spaced slots in the wall of the cylinder to allow the cylinder to collapse radially inward at approximately the midsection and around the electrical cable to be constrained. The geometry of the slots 132 must be such that when the smallest diameter cable in the design range is constrained, the slot edge pairs 125 and 125' and 126 and 126' do not interfere. That is, when longitudinal force is applied on rings 136 and 137 to cause the thin portion 134 to collapse radially inward, the slot edge pairs 125 and 125' and 126 and 126' will just barely touch or be separated by a minimum distance.

The grommet 131 and the body wall 115 may cooperate to preclude the possibility of the grommet collapsing radially outward. It would also be possible to shape the wall 115 to contact the grommet 131 and provide an initial radially inward force as the gland nut 121 and body member 111 are tightened to provide the axial compressive force on the grommet 131.

The strain relief grommet may be fabricated from ferrous or nonferrous metal and may be coated with a polymeric material or uncoated, or the grommet 131 may be fabricated from a plastic or polymeric material. However, the grommet 131 must have sufficient ductility so that it will bend and not crack when the grommet 131 collapses radially inward in response to the longitudinal force.

To provide a liquid tight seal, a sealing grommet 141 is provided. The sealing grommet 141 is made of a suitable material to permit sufficient elongation and to resist compressive set so that the smallest and largest cable diameters are properly sealed. As may be seen in FIG. 2, the sealing grommet 141 may be likened to a thin wall cylinder which is open at one end and closed at the other end, except that at the closed end there is a centrally located hole 142 which has a diameter somewhat less than the diameter of the smallest cable 102 which may be grippingly restrained by the strain relief fitting 101. As may be seen in FIG. 1, the sealing grommet 141 flexes and sealingly engages the electric cable 102 at points 143 and 144. The sealing grommet 141 may be made from an elastomeric material which has the required physical characteristics and which will resist aging or deterioration in the presence of conventional atmospheric contaminants. Special sealing grommets 141 may be provided when the strain relief fitting 101 is exposed to temperature and/or chemical atmospheres outside the normal range. The sealing grommet 141 may be made of nonuniform thickness material and/or may include a slightly enlarged and rounded cross section at the edges or other suitable modifications to satisfy the exigencies of the specific application.

The strain relief grommet 131 could be fabricated from an extruded flat strip material which is cut to length, perforated, and formed in its cylindrical shape. The ends may or may not be joined.

The assembly may include a fiber, metal, or polymeric washer 146 which has a hole 147 (see FIG. 4). If the washer 146 is made of metallic material, the hole 147 will be at least as large as the largest diameter cable 102 which may be accommodated by the fitting 101. If the washer 146 is made of an elastomeric or fiber material, the hole 147 may be somewhat smaller in diameter than the largest acceptable cable 102 and may include a plurality of radial slots extending from the hole 147 towards, but not reaching, the outer limits of the washer 146. When fabricated in this manner, the washer 146 will include a plurality of fingers 149 which will bear on the surface 145 of the sealing grommet 141 and help maintain its contact with the electric cable 102.

Strain relief fittings manufactured in accordance with the teaching shown herein have been tested and have been found to meet or exceed the Underwriters Laboratory test 514 relating to oven conditioning, pull out and rain test.

It will be appreciated by those experienced with using prior art strain relief devices that this device need not be disassembled to its various subcomponent parts in order to assemble it on a cable which is to be restrained.

While there has been shown and described what is considered at the present to be a preferred embodiment of the invention, modifications thereto will readily occur to those skilled in the related arts. For example, in another structure, other combinations of internal and external threaded fittings could be employed and an additional or substitute sealing grommet could be placed at the other end of the restraining grommet. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope of the invention.

What is claimed is:

1. A cord grip for restraining a cord against longitudinal motion with respect to said cord grip and comprising in combination:
    (a) a cylindrical shell extending longitudinally about an axis and having first and second ends for loosely surrounding a cord to be restrained;
    (b) said cylindrical shell including a plurality of spaced apart members connecting said first and second ends;
    (c) each of said spaced apart members being similar and having an upper, a lower and a central section having a thinner wall thickness than other portions of said spaced apart members; and wherein
    (d) the interior diameter of said cylindrical shell has a minimum value in the plane of said central section whereby said spaced apart members will collapse radially inward in said plane in response to axial compressive forces on said ends.

2. The combination as set forth in claim 1, wherein the separation between said spaced apart members is reduced in response to the radial inward collapse of said spaced apart members.

3. The combination as set forth in claim 9, wherein the width of the separation between said spaced apart members limits the maximum extent of the radial inward collapse of said spaced apart members by the edges of said spaced apart members contacting each other as the width of said separation at, at least, one point is reduced to zero in response to the radial inward collapse of said spaced apart members.

4. The combination as set forth in claim 1, wherein the interior surface of said spaced apart members includes surface irregularities.

5. The combination as set forth in claim 4, wherein said surface irregularities are situated on said central portion of said spaced apart members.

6. The combination as set forth in claim 1 and including a sealing grommet for restricting the transfer of liquids from one side of said grommet to the other.

7. The combination as set forth in claim 6, wherein said sealing grommet comprises a disc portion with a central opening.

8. The combination as set forth in claim 7 and including a body member comprising first and second members threadingly engaged and enclosing said cylindrical shell and said grommet.

9. The combination as set forth in claim 8, wherein said first and second members include first and second surfaces, respectively, with said first surface contacting said first end, and with said grommet situated between said second end and said second surface.

10. The combination as set forth in claim 1 and including a body member comprising first and second members threadingly engaged and enclosing said cylindrical shell.

11. The combination as set forth in claim 10, wherein said first and second members include first and second surfaces, respectively, for contacting said first and second ends, respectively.

12. The combination as set forth in claim 11, wherein said first and second surfaces exert compressive axial forces on said first and second ends when said first and second surfaces are brought closer together in response to an increased threading engagement between said first and second members.

13. The combination as set forth in claim 1, wherein said cylindrical shell comprises a nonconducting material.

* * * * *